United States Patent
Cohen

(10) Patent No.: US 11,496,062 B2
(45) Date of Patent: Nov. 8, 2022

(54) DC TRANSFORMER LOAD REGULATION CIRCUIT

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/136,356

(22) Filed: Dec. 29, 2020

(65) Prior Publication Data

US 2022/0014107 A1 Jan. 13, 2022

Related U.S. Application Data

(60) Provisional application No. 63/049,466, filed on Jul. 8, 2020.

(51) Int. Cl.
*H02M 3/335* (2006.01)

(52) U.S. Cl.
CPC .............................. *H02M 3/33592* (2013.01)

(58) Field of Classification Search
None
See application file for complete search history.

(56) References Cited

U.S. PATENT DOCUMENTS

| | | | |
|---|---|---|---|
| 5,073,849 A | 12/1991 | Morris | |
| 7,388,760 B2* | 6/2008 | Yasumura | H02M 1/10 363/17 |
| 8,629,627 B2* | 1/2014 | Cohen | H02M 3/33561 315/276 |
| 9,731,612 B2* | 8/2017 | Herriot | B60L 53/22 |
| 11,218,084 B2* | 1/2022 | Shirasawa | H02M 3/33569 |
| 2002/0101742 A1 | 8/2002 | Hosotani et al. | |
| 2005/0281059 A1 | 12/2005 | Yasumura | |
| 2009/0316445 A1 | 12/2009 | Mowrer et al. | |
| 2011/0199045 A1* | 8/2011 | Hui | H02M 7/53871 320/108 |
| 2014/0140113 A1 | 5/2014 | Oh | |
| 2019/0140639 A1 | 5/2019 | Mao et al. | |

FOREIGN PATENT DOCUMENTS

CN        106911153 A    *    6/2017

OTHER PUBLICATIONS

PCT International Search Report dated Oct. 14, 2021.

* cited by examiner

*Primary Examiner* — Jeffrey A Gblende
(74) *Attorney, Agent, or Firm* — Ray A. King; Charles A. Brill; Frank D. Cimino

(57) ABSTRACT

A circuit includes a transformer having first and second transformer inputs and first and second transformer outputs. The first transformer output can be adapted to be coupled through a capacitor to a first input of an output stage. The second transformer output can be adapted to be coupled to a second input of the output stage. The circuit also includes a switching system having first and second inputs and first and second switching outputs. The first input can be configured to receive a switching signal. The second input can be configured to receive an input voltage. The first and second switching outputs respectively can be coupled to the first and second transformer inputs.

14 Claims, 7 Drawing Sheets

DC TRANSFORMER LOAD REGULATION CIRCUIT

CROSS-REFERENCE TO RELATED APPLICATION

This application claims priority to U.S. Provisional Application Ser. No. 63/049,466, filed 8 Jul. 2020, which is incorporated herein in its entirety.

TECHNICAL FIELD

This description relates generally to electronic circuits, and more particularly to a power supply system.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. A typical power supply circuit can thus activate one or more switches to convert an input voltage to an output voltage. Typical power supply circuits can implement a transformer for delivering an output voltage on the secondary winding of a transformer from a square-wave input voltage applied by the switches to the primary winding of the transformer. For an ideal transformer (e.g., zero leakage inductance and zero winding resistance), rectifying the secondary voltage results in a DC output voltage that is equal to the input voltage multiplied by the turns ratio of the transformer. However, introducing physical separation between the primary and secondary windings of the transformer due to high isolation requirements can introduce significant leakage inductance in the transformer.

An increase in the output current of the transformer will cause a voltage drop on the impedance of the leakage inductance which will result in a reduction of the output voltage. Therefore, the output voltage will be dependent on the output current. To eliminate the effect of load current variation on the output voltage, typical power supply circuits include a resonant capacitor in series with the primary winding of the transformer to resonate with the leakage inductance. If the switching frequency of the converter is equal to the resonant frequency of the leakage inductance and the resonant capacitor, the impedances of these components will be equal and opposite and will mutually cancel. Therefore, no voltage drop will be associated with the load current, and the output voltage of the converter would be independent of the load current.

However, in practice, significant tolerances are present in both the resonant frequency of the capacitor and the leakage inductance, as well as in the switching frequency of the power converter. Consequently, the resonant frequency and switching frequency may differ significantly and the mismatch will prevent mutual cancellation of impedances, resulting in unacceptable dependence of the output voltage on the output load. If the switching frequency of the converter is lower than the resonant frequency, the interaction between the resonant capacitor and the magnetizing inductance of the transformer will generate a voltage that will considerably increase the output voltage of the converter.

SUMMARY

A circuit includes a transformer having first and second transformer inputs and first and second transformer outputs. The first transformer output can be adapted to be coupled through a capacitor to a first input of an output stage. The second transformer output can be adapted to be coupled to a second input of the output stage. The circuit also includes a switching system having first and second inputs and first and second switching outputs. The first input can be configured to receive a switching signal. The second input can be configured to receive an input voltage. The first and second switching outputs respectively can be coupled to the first and second transformer inputs.

A switching power supply system includes a switching system having a switching input and a switching output. The switching system includes switches configured to close responsive to a switching signal at the switching input. The switching system can be configured to provide a first voltage at the switching output responsive to closing the switches. The system also includes a transformer including a primary winding and a secondary winding. The primary winding can be coupled to the switching output and configured to receive the first voltage. The secondary winding can be configured to provide a second voltage responsive to the first voltage. The system also includes a capacitor coupled to the secondary winding. The system further includes an output stage coupled to the capacitor. The output stage can be configured to generate an output voltage by rectifying the second voltage.

A switching power supply system includes a switching system having first and second inputs and first and second switching outputs. The first input can be configured to receive a switching signal having a switching frequency. The second input can be configured to receive an input voltage. The system also includes a transformer having a primary winding and a secondary winding. The primary winding can have first and second transformer inputs. The secondary winding can have first and second transformer outputs, in which the first transformer input is coupled to the first switching output, and the second transformer input is coupled to the second switching output. The system also includes an output stage having a first and second voltage inputs and a voltage output. The second voltage input can be coupled to the second transformer output. The output stage can be configured to provide an output voltage at the voltage output responsive to the first and second voltage inputs. The system further includes a capacitor coupled between the first transformer output and the first voltage input, in which the capacitor and the secondary winding have a resonant frequency above the switching frequency.

DETAILED DESCRIPTION

Figure 1:
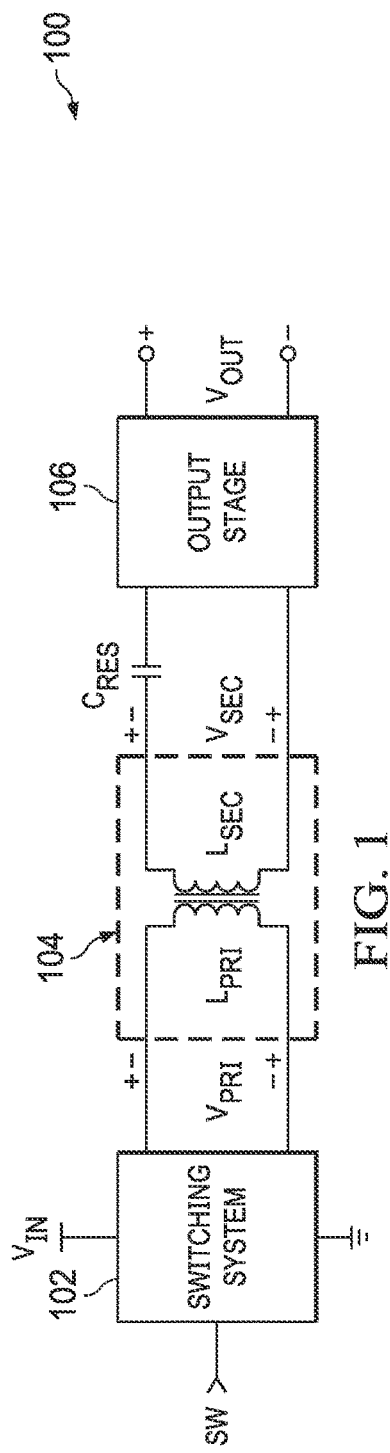
FIG. 1 is a schematic diagram an example of a power supply system.

This description relates generally to electronic circuits, and more particularly to a power supply system. The power supply system can be implemented as a switching power supply system that includes a transformer to inductively transfer a voltage from a primary winding (or windings) to a secondary winding to generate an output voltage based on an input voltage. The power supply system includes a switching stage that includes a set of switches that are activated to provide a square-wave input voltage to the primary winding of the transformer. Therefore, a secondary voltage based on an input voltage is generated on the secondary winding of the transformer. For example, the switching stage can be configured as one of a half-bridge switching circuit, a full-bridge switching circuit, a push-switching circuit, or any of a variety of other types of switching circuits. The power supply system also includes an output stage that is configured to provide an output voltage based on the secondary voltage. For example, the output voltage can be approximately equal to the input voltage multiplied by a turns ratio of the transformer. For example, the output stage can be configured as a rectifier circuit (e.g., full-wave rectifier) to provide a positive amplitude of the output voltage at each of opposite polarities of the secondary voltage.

For example, typical resonant power supply systems include a resonant capacitor in series with the primary winding of the transformer to resonate with leakage current of the transformer reflected to the primary inductor. If the switching frequency corresponding to the frequency of the bidirectional voltage pulses through the primary winding is equal to the resonant frequency of the leakage inductance and the resonant capacitor in the typical power supply system, then the respective voltages across the resonant capacitor and the leakage inductance are equal in amplitude and opposite in phase and cancel mutually. However, if the switching frequency is not equal to the resonant frequency of the leakage inductance and the resonant capacitor in the typical power supply system, then the cancellation is no longer mutually equal and opposite in phase, so the voltage cancellation difference subtracts from the amplitude of the output voltage. For example, when operating at a switching frequency higher than the resonant frequency, the output voltage will be lower than at resonance. As another example, if the switching frequency is lower than the resonant frequency, the voltage on the resonant capacitor will increase the voltage across the primary winding, resulting in an amplitude of the output voltage that is greater than the amplitude of the output voltage when the switching frequency is equal to the resonant frequency.

To mitigate errors in the output voltage, such as undesirable increases in the amplitude of the output voltage, the power supply system can include a resonant capacitor that is arranged in series with the secondary winding of the transformer. The resonant capacitor can resonate with a leakage inductance of the transformer, as reflected on the secondary winding. Therefore, the leakage inductance of the transformer and the resonant capacitor can exhibit a resonant frequency. Because the power supply system described herein includes the resonant capacitor in series with the secondary winding of the transformer, the power supply system can provide soft switching of the switching system at switching frequencies both above and below the resonant frequency of the resonant capacitor and leakage inductance of the transformer. Therefore, the switching system can be operated at a switching frequency that is less than the resonant frequency without affecting the amplitude of the output voltage. Accordingly, the switching frequency can be set to a frequency that is less than resonant frequency to accommodate fabrication tolerances that can affect the frequency of the switching frequency without deleteriously increasing the amplitude of the output voltage.

FIG. 1 illustrates an example of a switching power supply system 100. The power supply system 100 can be implemented in any of a variety of circuit applications for efficiently providing an output voltage $V_{OUT}$ based on an input voltage $V_{IN}$. The power supply system 100 includes a switching system 102 that includes at least one switch periodically activated responsive to a switching signal SW. For example, the switching signal SW can correspond to a clock signal that is provided at a controlled frequency, referred to hereinafter as "switching frequency" and described in greater detail herein. Therefore, the terms "switching frequency" and "frequency of the switching signal SW" are used interchangeably herein. For example, the switching system 102 can include an arrangement of transistors (e.g., metal-oxide semiconductor field-effect transistors (MOSFETs)) that can be activated by different phases of the switching signal SW. For example, the switching system 102 can be arranged as a full-bridge, a half-bridge, a push-pull circuit, or any of a variety of other switching circuits.

The power supply system 100 also includes a transformer 104 that includes a primary winding $L_{PRI}$ and a secondary winding $L_{SEC}$. For example, the switch(es) in the switching system 102 can be activated to provide the input voltage $V_{IN}$ as a square-wave to the primary winding $L_{PRI}$ to provide a primary voltage $V_{PRI}$ on the primary winding $L_{PRI}$. As shown in the example of FIG. 1, the primary voltage $V_{PRI}$ can reverse polarity in each switching cycle of the switch(es) in the switching system 102. The transformer 104 therefore induces a secondary voltage $V_{SEC}$ on the secondary winding $L_{SEC}$ responsive to the primary voltage $V_{PRI}$ being provided on the primary winding $L_{PRI}$.

The power supply system 100 also includes an output stage 106 that can provide the output voltage $V_{OUT}$ based on the secondary voltage $V_{SEC}$. For example, the output voltage $V_{OUT}$ can have an amplitude that is approximately equal to the input voltage $V_{IN}$ multiplied by a turns ratio of the transformer 104. As described above, the primary voltage $V_{PRI}$ can reverse polarity, so the secondary voltage $V_{SEC}$ can likewise reverse polarity in each of the switching cycles of the switching frequency. Therefore, the output stage 106 can be configured as a rectifier (e.g., a full wave rectifier) configured to provide a positive amplitude of the output voltage $V_{OUT}$ during each of the phases of the secondary voltage $V_{SEC}$, as inductively provided from the respective phases of the primary voltage $V_{PRI}$. For example, other arrangements of the output stage 106 are possible (e.g., as a voltage doubler). The output voltage $V_{OUT}$ can be provided, for example, across an output capacitor to a load. As described in greater detail herein, the switching frequency can be variable and can be based on the load.

The power supply system 100 further includes a resonant capacitor $C_{RES}$ that is coupled to the secondary winding $L_{SEC}$ of the transformer 104. Therefore, the resonant capacitor $C_{RES}$ and the leakage inductance of the transformer reflected to the secondary winding $L_{SEC}$ can form a resonator on the secondary of the transformer 104 (hereinafter "the secondary resonator") having a resonant frequency. Based on the coupling of the resonant capacitor $C_{RES}$ to the secondary winding $L_{SEC}$ to form the secondary resonator, the power supply system 100 can be configured to operate at frequencies of the switching signal SW that are less than a resonant frequency of the secondary resonator while maintaining an approximately constant target amplitude of the output voltage $V_{OUT}$. As described herein, the term "approximately" can include some deviation from an exact value (e.g., +/−5%).

For example, the polarity of the primary voltage $V_{PRI}$ changes at the switching frequency, with the amplitude of a primary current through the primary winding $L_{PRI}$ being approximately equal to zero between each phase of the switching signal SW. Thus, the secondary voltage $V_{SEC}$ likewise changes polarity at the switching frequency, with the amplitude of a current through the secondary winding $L_{SEC}$ being approximately equal to zero between each phase of the switching signal SW. When the secondary voltage $V_{SEC}$ changes polarity at the switching frequency that is less than the resonant frequency of the secondary resonator, then the resonant capacitor $C_{RES}$ can have a residual voltage (e.g., less than the output voltage $V_{OUT}$) between each phase of the switching signal SW. When the current through the secondary winding $L_{SEC}$ has an amplitude of approximately zero between each phase of the switching signal SW, the output stage 106 can isolate the resonant capacitor $C_{RES}$ from the output of the power supply system 100 (e.g., based on the rectifier(s) in the output stage 106), so the output stage 106 can behave as an open circuit between the resonant capacitor $C_{RES}$ and the low-voltage rail. Therefore, current is not resonated back from the resonant capacitor $C_{RES}$ to the leakage inductance reflected to the secondary winding $L_{SEC}$, and thus the voltage on the resonant capacitor $C_{RES}$ does not change when the amplitude of the current through the secondary winding $L_{SEC}$ is approximately zero. Thus, the output voltage $V_{OUT}$ likewise does not change at zero amplitude of the current through the secondary winding $L_{SEC}$ between phases of the switching signal SW.

As a result, the output voltage $V_{OUT}$ can therefore be held at an approximately constant amplitude at frequencies of the switching signal SW that are equal to or less than the resonant frequency of the secondary resonator, as opposed to typical resonant power supply systems. Accordingly, the switching signal SW can be set at a frequency that is less than the resonant frequency of the secondary resonator to provide a constant amplitude of the output voltage $V_{OUT}$, despite inherent variations of the frequency of the switching signal SW and/or the resonant frequency of the secondary resonator that can result from fabrication tolerances and errors. Therefore, errors in the amplitude of the output voltage $V_{OUT}$ can be mitigated in the power supply system 100.

For example, typical resonant power supply systems include a resonant capacitor in series with the primary winding of the transformer to resonate with leakage inductance of the transformer reflected to the primary winding. If the switching frequency corresponding to the frequency of the bidirectional current pulses through the primary winding is equal to the resonant frequency of the leakage inductance and the resonant capacitor in the typical power supply system, then the voltage across the leakage inductance is transferred equally and oppositely across the resonant capacitor at the resonant frequency. However, if the switching frequency is not equal to the resonant frequency of the primary winding and the resonant capacitor in the typical power supply system, then the output voltage can exhibit errors. For example, operating at a switching frequency that is greater than the resonant frequency can result in poor load regulation. As another example, if the switching frequency is lower than the resonant frequency, the switches of a typical converter continue to apply voltage to the resonant capacitor via the magnetizing inductance of the transformer even after the current in the secondary winding drops to zero, thereby overcharging it. The overcharge of the resonant capacitor increases the voltage of the resonant capacitor, which results in a significant increase of the output voltage of the typical converter.

Thus, as opposed to the typical converter, the power supply system 100 includes the resonant capacitor $C_{RES}$ in series with the secondary winding $L_{SEC}$ instead of in series with the primary winding $L_{PRI}$. By providing the resonant capacitor $C_{RES}$ in series with the secondary winding $L_{SEC}$ (instead of in series with the primary winding $L_{PRI}$), flow of current into the resonant capacitor $C_{RES}$ is not possible after the current in the secondary winding $L_{SEC}$ drops to zero, thereby eliminating the overcharge of the resonant capacitor $C_{RES}$ and the increase in output voltage $V_{OUT}$ at switching frequencies below the resonant frequency.

Figure 2:
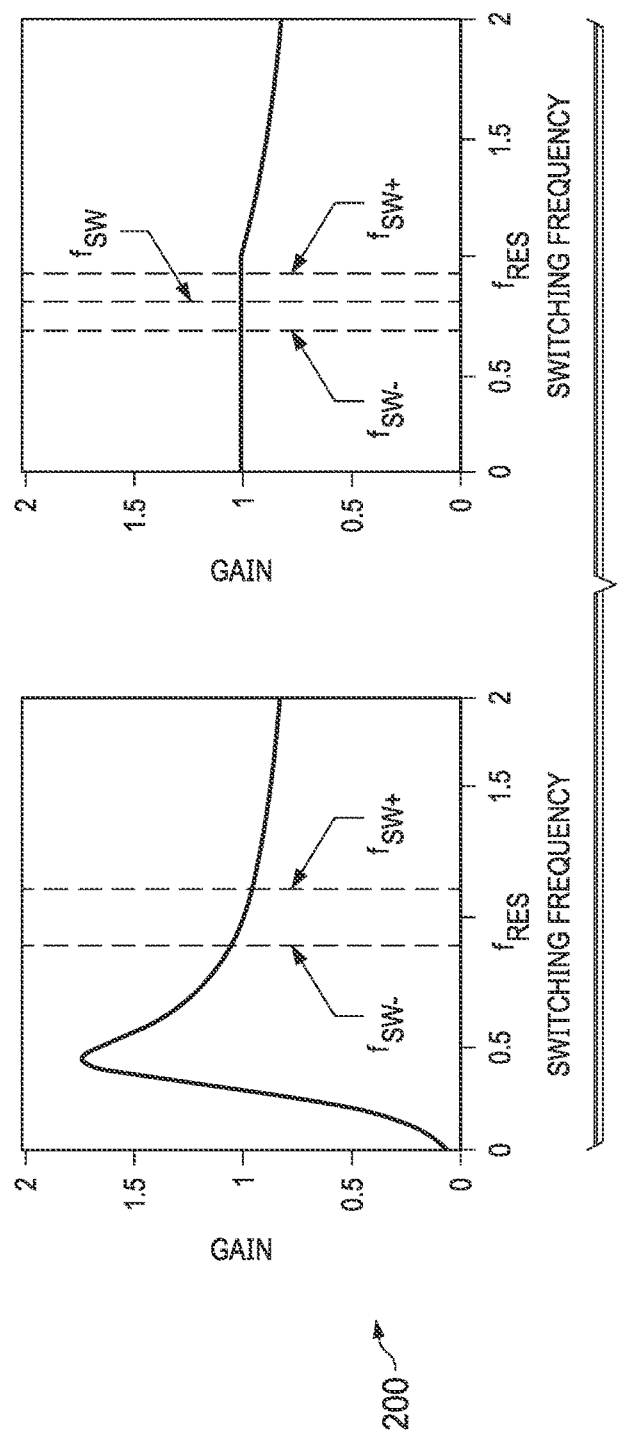
FIG. 2 is a diagram of frequency/gain graphs.

The relationship between the frequency of the switching signal SW and the resonant frequency is shown in the example of FIG. 2. FIG. 2 illustrates an example diagram 200 of frequency/gain graphs. The diagram 200 shows a first graph 202 that can correspond to a typical power supply system. The first graph 204 demonstrates gain of the typical power supply system plotted as a function of switching frequency for the typical power supply system, and shows a frequency $f_{RES}$ that is the resonant frequency (e.g., ideal or component-rated resonant frequency) of the resonator formed by a resonant capacitor and the leakage inductance of a transformer. The switching frequency of the first graph 202 includes a frequency $f_{RES}$ that is the resonant frequency of the resonator formed by the resonant capacitor and the leakage inductance of the transformer. Greater values along the X-axis are values of the switching frequency of the typical power supply system that are therefore greater than the resonant frequency $f_{RES}$, and lesser values along the X-axis are values of the switching frequency of the typical power supply system that are therefore less than the resonant frequency $f_{RES}$. The gain of the first graph 202 includes a unity gain "1" corresponding to a desired design amplitude of an output voltage. Greater values along the Y-axis are values of the gain of the typical power supply system that are greater than unity and therefore result in increased amplitudes of the desired output voltage, and lesser values along the Y-axis are values of the gain of the typical power supply system that are less than unity and therefore result in decreased amplitudes of the desired output voltage.

As described above, operating at a switching frequency that is greater than the resonant frequency $f_{RES}$ formed by the resonant capacitor and the leakage inductance in the typical power supply system can result in poor load regulation and output voltage dependency on variances of the switching frequency and the values of the resonant capacitance and leakage inductance of the transformer. Therefore, the first graph 202 shows that at switching frequencies of the typical power supply system above the resonant frequency $f_{RES}$, the gain of the typical power supply system decreases. As also described above, responsive to the switching frequency being less than the resonant frequency $f_{RES}$, an excess voltage develops on the resonant capacitor between consecutive half switching cycles. The excess voltage is added to the primary voltage on the primary winding of the transformer on the next switching cycle, thereby increasing the output voltage. Therefore, the first graph 202 shows that at switching frequencies of the typical power supply system that are less than the resonant frequency $f_{RES}$, the gain increases significantly, thus boosting the output voltage to unacceptable levels. Therefore, the switching frequency of the typical power supply system is set to approximately the resonant frequency $f_{RES}$.

As described above, the switching frequency and/or the resonant frequency can be subject to inherent variations that can result from fabrication tolerances and errors. In the example of FIG. 2, the inherent variations in the switching frequency and/or the resonant frequency are shown as a window bounded by $f_{SW+}$ and $f_{SW-}$ that are equal and opposite the resonant frequency $f_{RES}$ at which the switching frequency is set. Therefore, if the switching frequency of the typical power supply system deviates or drifts from the resonant frequency $f_{RES}$ within the inherent variations defined by the window bounded by $f_{SW+}$ and $f_{SW-}$, the gain of the typical power supply system can vary significantly, resulting in errors in the desired output voltage $V_{OUT}$.

The diagram 200 includes a second graph 204 that demonstrates gain of the power supply system 100 plotted as a function of switching frequency for the power supply system 100. For example, the gain can correspond to a gain of the output voltage $V_{OUT}$ and the switching frequency can correspond to the frequency of the switching signal SW. The switching frequency of the second graph 204 includes a frequency $f_{RES}$ that is the resonant frequency (e.g., ideal or component-rated resonant frequency) of the secondary resonator. Greater values along the X-axis are values of the frequency of the switching signal SW that are therefore greater than the resonant frequency $f_{RES}$, and lesser values along the X-axis are values of the frequency of the switching signal SW that are therefore less than the resonant frequency $f_{RES}$. The gain of the second graph 204 includes a unity gain "1" corresponding to a desired design amplitude of the output voltage $V_{OUT}$. Greater values along the Y-axis are values of the gain of the power supply system 100 that are greater than unity and therefore result in increased amplitudes of the desired output voltage $V_{OUT}$, and lesser values along the Y-axis are values of the gain of the power supply system 100 that are less than unity and therefore result in decreased amplitudes of the desired output voltage $V_{OUT}$.

The second graph 204 shows that at frequencies of the switching signal SW above the resonant frequency $f_{RES}$, the gain of the power supply system 100 decreases. However, based on the coupling of the resonant capacitor $C_{RES}$ to the secondary winding $L_{SEC}$ to form the secondary resonator (as opposed to a resonant capacitor coupled to the primary winding, as in the typical converter associated with the first graph 202), the second graph 204 also shows that the gain of the power supply system 100 is constant at frequencies of the switching signal SW that are less than or equal to the resonant frequency $f_{RES}$. Therefore, the power supply system 100 can be configured to operate at a frequency of the switching signal SW less than the resonant frequency $f_{RES}$ while maintaining a unity gain of the power supply system 100, and thus maintaining the desired amplitude of the output voltage $V_{OUT}$.

For example, the switching signal SW can be set at a frequency that is less than the resonant frequency $f_{RES}$ to provide a constant amplitude of the output voltage $V_{OUT}$, despite the inherent variations of the frequency of the switching signal SW and/or the resonant frequency that can result from fabrication tolerances and errors. For example, the frequency of the switching signal SW can be set to a frequency $f_{SW}$ that is less than the resonant frequency $f_{RES}$. In the example of FIG. 2, the inherent variations of the frequency of the switching signal SW and/or the resonant frequency are shown as a window bounded by $f_{SW+}$ and $f_{SW-}$ that are equal and opposite the frequency $f_{SW}$ corresponding to the frequency at which the switching signal SW is set. As a result, if the frequency of the switching signal SW deviates or drifts from the switching frequency $f_{SW}$ within the inherent variations defined by the window bounded by $f_{SW+}$ and $f_{SW-}$, the gain of the power supply system 100 can remain at unity, and thus errors in the desired output voltage $V_{OUT}$ can be mitigated. Therefore, the second graph 204 shows that if the power supply circuit 300 is designed so the maximum possible frequency of the switching signal SW is lower than the minimum possible resonant frequency $f_{RES}$ (e.g., with all variances accounted for), the output voltage $V_{OUT}$ becomes (in essence) independent of variances in the frequency of the switching signal SW and the actual resonant frequency of the secondary resonator.

Figure 3:
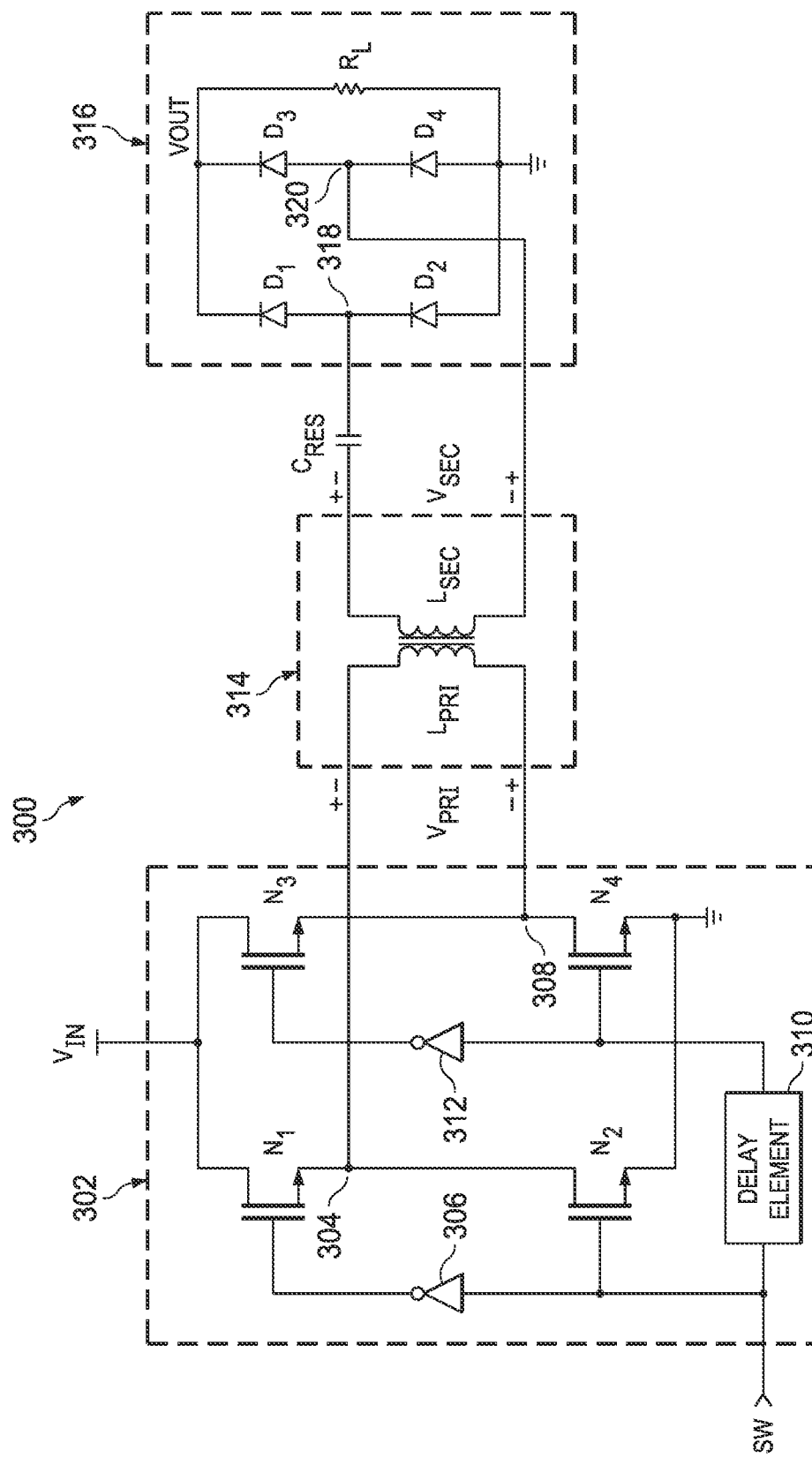
FIG. 3 is a schematic of a power supply circuit.

FIG. 3 illustrates an example of a power supply circuit 300. The power supply circuit 300 can be implemented in any of a variety of circuit applications for efficiently providing an output voltage $V_{OUT}$ based on an input voltage $V_{IN}$. The 300 can correspond to the power supply system 100 in the example of FIG. 1. Therefore, reference is to be made to the examples of FIGS. 1 and 2 in the following description of the example of FIG. 3.

The power supply circuit 300 includes a switching system 302 that includes a set of MOSFET switches that are periodically activated responsive to a switching signal SW. In the example of FIG. 3, the switching system 302 includes a first N-channel FET (NFET) $N_1$ and a second NFET $N_2$. The first NFET $N_1$ interconnects the input voltage $V_{IN}$ and a first switching node 304, and the second NFET $N_2$ interconnects the first switching node 304 and a low-voltage rail (e.g., ground). The second NFET $N_2$ is controlled at a gate by the switching signal SW, and the first NFET $N_1$ is controlled at a gate by an inverted version of the switching signal SW through an inverter 306. The switching system 302 also includes a third NFET $N_3$ and a fourth NFET $N_4$. The third NFET $N_3$ interconnects the input voltage $V_{IN}$ and a second switching node 308, and the fourth NFET $N_4$ interconnects the second switching node 308 and the low-voltage rail. The fourth NFET $N_4$ is controlled at a gate by a delayed version of the switching signal SW, as provided through a delay element 310, and the third NFET $N_3$ is controlled at a gate by an inverted version of the delayed switching signal SW through an inverter 312.

Therefore, the NFETs $N_1$ through $N_4$ are arranged as a full-bridge. For example, the switching signal SW can correspond to a clock signal that is provided at a switching frequency. The delay element 310 can provide a static delay of the state transitions of the switching signal SW (e.g., approximately half the period of the resonant frequency of the secondary resonator). The power supply circuit 300 also includes a transformer 314 that includes a primary winding $L_{PRI}$ and a secondary winding $L_{SEC}$. The primary winding $L_{PRI}$ is coupled to the first switching node 304 and the second switching node 308. Therefore, the NFETs $N_1$ through $N_4$ can be activated (e.g., turned on and closed) in a sequence by the switching signal SW to couple the input voltage $V_{IN}$ as a square-wave to the primary winding $L_{PRI}$ to provide a primary voltage $V_{PRI}$ on the primary winding $L_{PRI}$.

Based on the full-bridge arrangement of the switching system 302, and based on the delay provided by the delay element 310, the sequence of activation of the NFETs $N_1$ through $N_4$ can result in four states of the switching system 302. In a first state, the NFET $N_1$ and the NFET $N_4$ are both activated. In a second state, the NFET $N_3$ and the NFET $N_2$ are both activated. In a third state, the NFETs $N_1$ and $N_3$ are both activated. In a fourth state, the NFETs $N_2$ and $N_4$ are both activated. Therefore, in the third and fourth states, the primary winding $L_{PRI}$ is short-circuited to provide zero amplitude of the primary voltage $V_{PRI}$. As described in greater detail herein, the third and fourth states of the switching system 302 can facilitate load regulation of the power supply circuit 300.

As described above, the polarity of the primary voltage $V_{PRI}$ is alternately reversed in each switching cycle of the NFETs $N_1$ through $N_4$ in the switching system 302, as provided by the switching signal SW. The transformer 314 therefore induces a secondary voltage $V_{SEC}$ in the secondary winding $L_{SEC}$ responsive to the primary voltage $V_{PRI}$ being provided in the primary winding $L_{PRI}$. The secondary voltage $V_{SEC}$ likewise reverses polarity in each of the first state and second state switching cycles of the NFETs $N_1$ through $N_4$ in the switching system 302, as provided by the switching signal SW.

The power supply circuit 300 also includes an output stage 316 that can provide the output voltage $V_{OUT}$ across a load, shown as a load resistor $R_L$, based on the secondary voltage $V_{SEC}$. In the example of FIG. 3, the output stage 316 includes a first diode $D_1$ having an anode coupled to a first node 318 and a cathode coupled to the load resistor $R_L$, and includes a second diode $D_2$ having an anode coupled to the low-voltage rail (e.g., isolated from the low-voltage rail in the switching system 302) and a cathode coupled to the first node 318. The output stage 316 also includes a third diode $D_3$ having an anode coupled to a second node 320 and a cathode coupled to the load resistor $R_L$, and includes a fourth diode $D_4$ having an anode coupled to the low-voltage rail and a cathode coupled to the second node 320. Therefore, the output stage 316 is arranged as a full-wave rectifier that provides a positive amplitude of the output voltage $V_{OUT}$ during each of the phases of the bidirectional secondary voltage $V_{SEC}$, as inductively provided from the respective phases of the bidirectional primary voltage $V_{PRI}$. The output stage 316 is shown in the example of FIG. 3 by example, and can be arranged in any of a variety of different ways (e.g., as a voltage doubler) to provide the output voltage $V_{OUT}$ based on the secondary voltage $V_{SEC}$.

The power supply circuit 300 further includes a resonant capacitor $C_{RES}$ that is coupled to the secondary winding $L_{SEC}$ of the transformer 314. Therefore, the resonant capacitor $C_{RES}$ and the secondary winding $L_{SEC}$ can form a secondary resonator, as described above. As described above in the examples of FIGS. 1 and 2, based on the coupling of the resonant capacitor $C_{RES}$ to the secondary winding $L_{SEC}$ to form the secondary resonator, the power supply circuit 300 can be configured to operate at a frequency of the switching signal SW less than a resonant frequency of the secondary resonator while maintaining a target amplitude of the output voltage $V_{OUT}$. For example, between each phase of the primary voltage $V_{PRI}$ on the primary winding $L_{PRI}$, current in the secondary winding $L_{SEC}$ is approximately zero. However, when the current in the secondary winding $L_{SEC}$ has an amplitude of approximately zero between each phase of the switching signal SW, the output stage 316 can isolate the resonant capacitor $C_{RES}$ from the output of the power supply circuit 300 (e.g., based on the rectifiers $D_1$ through $D_4$ in the output stage 316), so the output stage 316 can behave as an open circuit between the resonant capacitor $C_{RES}$ and the low-voltage rail to prevent a change in the voltage of the resonant capacitor $C_{RES}$ at zero amplitude of the current in the secondary winding $L_{SEC}$. Thus, the output voltage $V_{OUT}$ can be held at an approximately constant amplitude at frequencies of the switching signal SW that are equal to or less than the resonant frequency of the secondary resonator, as opposed to typical resonant power supply systems. Accordingly, the switching signal SW can be set at a frequency (e.g., $f_{SW}$ in the example of FIG. 2) that is less than the resonant frequency (e.g., $f_{RES}$ in the example of FIG. 2) of the secondary resonator to provide a constant amplitude of the output voltage $V_{OUT}$. As a result, errors in the amplitude of the output voltage $V_{OUT}$ can be mitigated in the power supply circuit 300.

Figure 4:
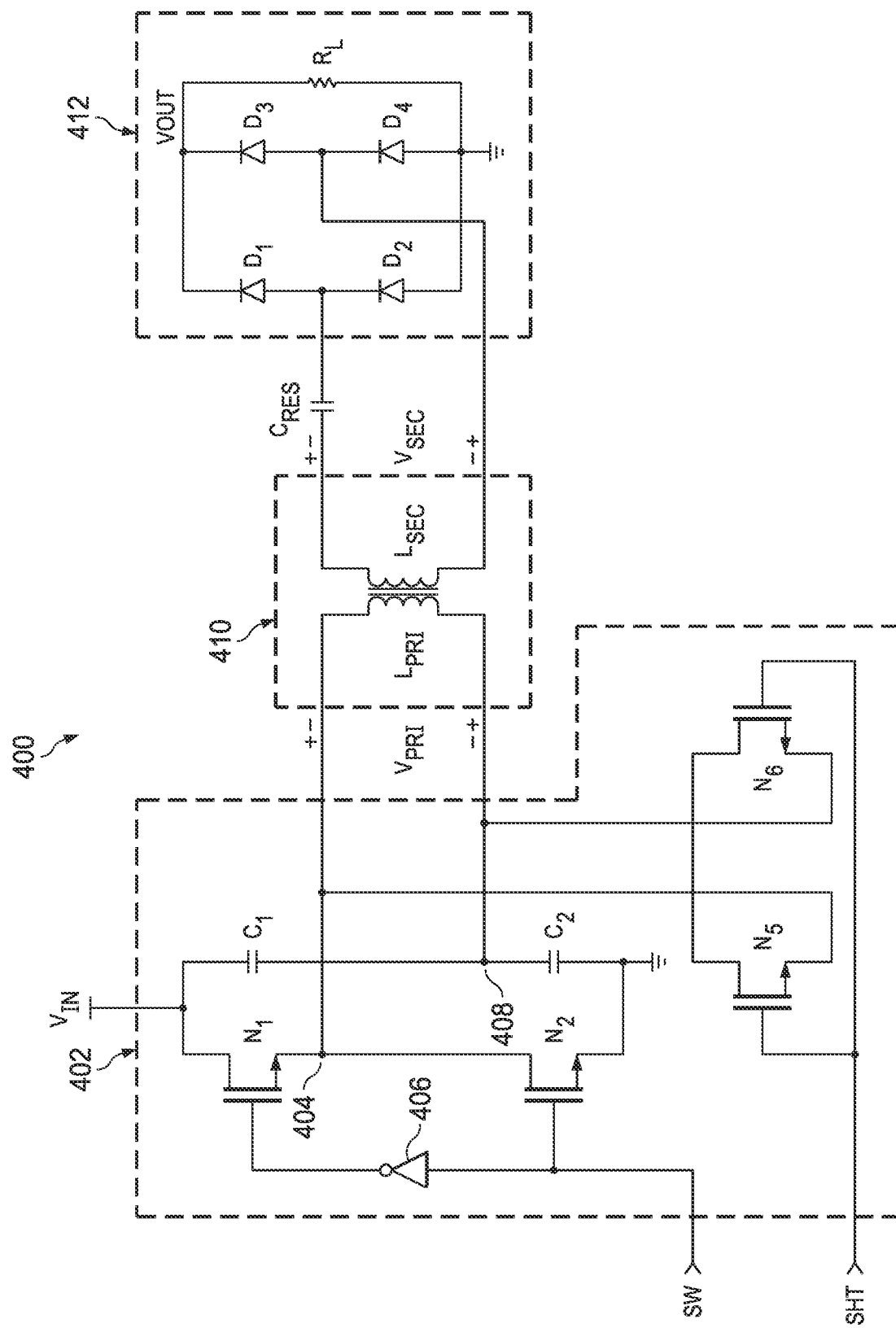
FIG. 4 is another schematic of a power supply circuit.

FIG. 4 illustrates an example of a power supply circuit 400. The power supply circuit 400 can be implemented in any of a variety of circuit applications for efficiently providing an output voltage $V_{OUT}$ based on an input voltage $V_{IN}$. The power supply circuit 400 can correspond to the power supply system 100 in the example of FIG. 1. Therefore, reference is to be made to the examples of FIGS. 1 and 2 in the following description of the example of FIG. 4.

The power supply circuit 400 includes a switching system 402 that includes a set of MOSFET switches that are periodically activated responsive to a switching signal SW. In the example of FIG. 4, the switching system 402 includes a first NFET $N_1$ and a second NFET $N_2$. The first NFET $N_1$ interconnects the input voltage $V_{IN}$ and a first switching node 404, and the second NFET $N_2$ interconnects the first switching node 404 and a low-voltage rail (e.g., ground). The second NFET $N_2$ is controlled at a gate by the switching signal SW, and the first NFET $N_1$ is controlled at a gate by an inverted version of the switching signal SW through an inverter 406. The switching system 402 also includes a first capacitor $C_1$ and a second capacitor $C_2$. The first capacitor $C_1$ interconnects the input voltage $V_{IN}$ and a second switching node 408, and the second capacitor $C_2$ interconnects the second switching node 408 and the low-voltage rail.

Therefore, the NFETs $N_1$ and $N_2$ and the capacitors $C_1$ and $C_2$ are arranged as a half-bridge. For example, the switching signal SW can correspond to a clock signal that is provided at a switching frequency. The power supply circuit 400 also includes a transformer 410 that includes a primary winding $L_{PRI}$ and a secondary winding $L_{SEC}$. The primary winding $L_{PRI}$ is coupled to the first switching node 404 and the second switching node 408. Therefore, the NFETs $N_1$ and $N_2$ can be activated in a sequence by the switching signal SW to couple the input voltage $V_{IN}$ as a square-wave to the primary winding $L_{PRI}$ to provide a primary voltage $V_{PRI}$ on the primary winding $L_{PRI}$. Based on the half-bridge arrangement of the switching system 402, the sequence of activation of the NFETs $N_1$ and $N_2$ can result in two states of the switching system 402. In a first state, the NFET $N_1$ is activated. In a second state, the NFET $N_2$ is activated.

Also, the switching system 402 includes an NFET $N_5$ and an NFET $N_6$ that are each controlled by a signal SHT. The NFET $N_5$ is coupled to the first switching node 404 and to the NFET $N_6$, and the NFET $N_6$ is coupled to the second switching node 408 and the NFET $N_5$. Therefore, the signal SHT is provided to concurrently activate the NFETs $N_5$ and $N_6$ to short the primary winding $L_{PRI}$. For example, the signal SHT can be provided from logic or a state machine that can periodically assert the signal SHT (e.g., at each cycle or a number of cycles of the switching signal SW), so the primary winding $L_{PRI}$ is short-circuited to provide zero amplitude of the primary voltage $V_{PRI}$. As described in greater detail herein, the shorting of the primary winding $L_{PRI}$ can facilitate load regulation of the power supply circuit 400.

As described above, the polarity of the primary voltage $V_{PRI}$ is alternately reversed in each switching cycle of the NFETs $N_1$ and $N_2$ in the switching system 402, as provided by the switching signal SW. The transformer 410 therefore induces a secondary voltage $V_{SEC}$ in the secondary winding $L_{SEC}$ responsive to the primary voltage $V_{PRI}$ being provided in the primary winding $L_{PRI}$. The secondary voltage $V_{SEC}$ is likewise reverses polarity in each of the switching cycles of the NFETs $N_1$ and $N_2$ in the switching system 402, as provided by the switching signal SW.

The power supply circuit 400 also includes an output stage 412 that can provide the output voltage $V_{OUT}$ across a load, shown as a load resistor $R_L$, based on the secondary voltage $V_{SEC}$. In the example of FIG. 4, the output stage 412 includes a first diode $D_1$, a second diode $D_2$, a third diode $D_3$, and a fourth diode $D_4$, and is therefore arranged substantially the same as the output stage 316 in the example of FIG. 3.

The power supply circuit 400 further includes a resonant capacitor $C_{RES}$ that is coupled to the secondary winding $L_{SEC}$ of the transformer 410. The arrangement of the resonant capacitor $C_{RES}$ and the secondary winding $L_{SEC}$ are therefore the same as described above in the example of FIG. 3. Accordingly, the switching signal SW can be set at a frequency (e.g., $f_{SW}$ in the example of FIG. 2) that is less than the resonant frequency (e.g., $f_{RES}$ in the example of FIG. 2) of the secondary resonator formed to provide a constant amplitude of the output voltage $V_{OUT}$. As a result, errors in the amplitude of the output voltage $V_{OUT}$ can be mitigated in the power supply circuit 400.

Figure 5:
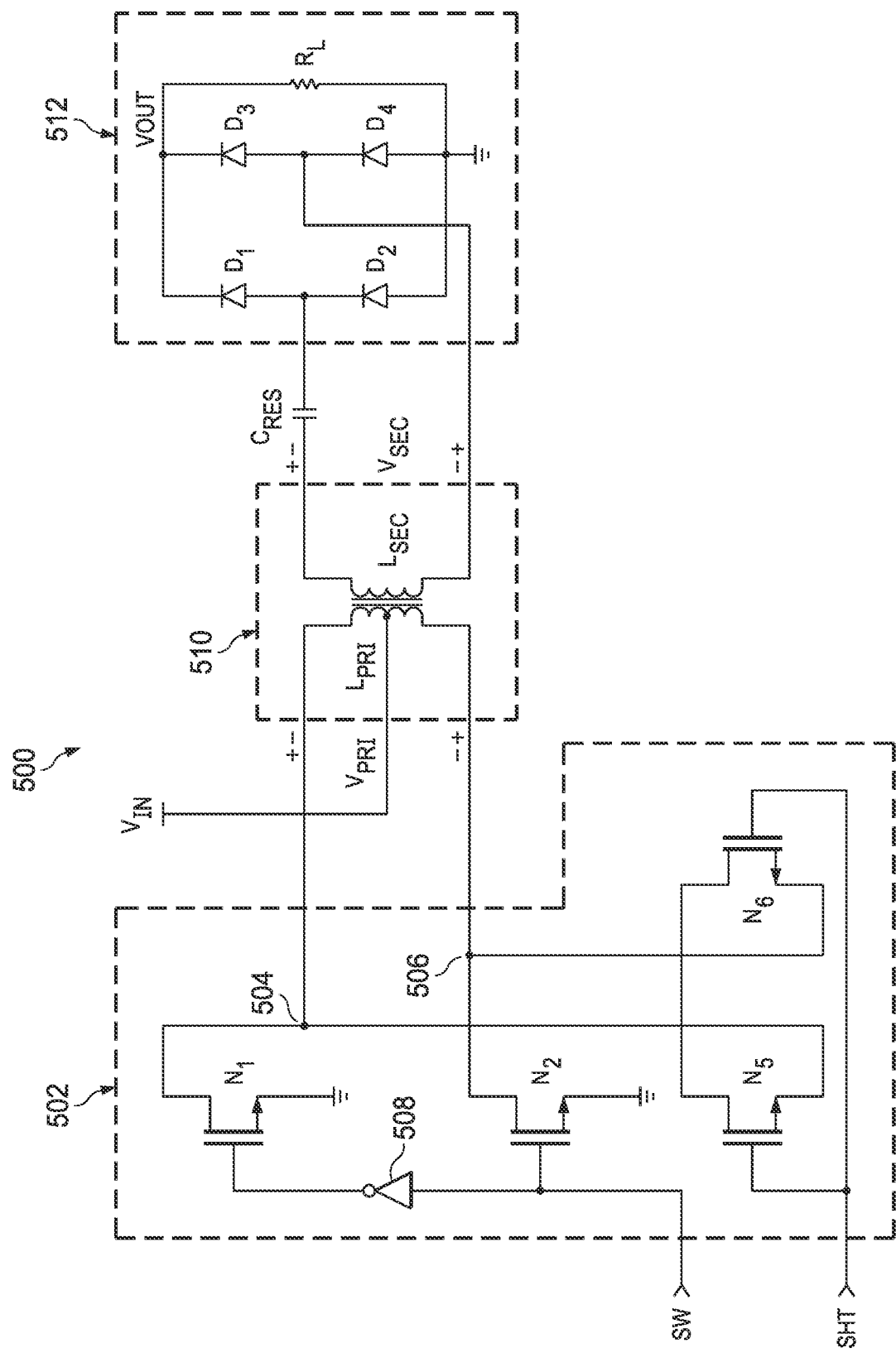
FIG. 5 is another schematic of a power supply circuit.

FIG. 5 illustrates an example of a power supply circuit 500. The power supply circuit 500 can be implemented in any of a variety of circuit applications for efficiently providing an output voltage $V_{OUT}$ based on an input voltage $V_{IN}$. The power supply circuit 500 can correspond to the power supply system 100 in the example of FIG. 1. Therefore, reference is to be made to the examples of FIGS. 1 and 2 in the following description of the example of FIG. 5.

The power supply circuit 500 includes a switching system 502 that includes a set of MOSFET switches that are periodically activated responsive to a switching signal SW. In the example of FIG. 5, the switching system 502 includes a first NFET $N_1$ and a second NFET $N_2$. The first NFET $N_1$ interconnects a first switching node 504 and a low-voltage rail (e.g., ground) and the second NFET $N_2$ interconnects a second switching node 506 and the low-voltage rail. The second NFET $N_2$ is controlled at a gate by the switching signal SW and the first NFET $N_1$ is controlled at a gate by an inverted version of the switching signal SW through an inverter 508.

Therefore, the NFETs $N_1$ and $N_2$ are arranged as a push-pull circuit. For example, the switching signal SW can correspond to a clock signal that is provided at a switching frequency. The power supply circuit 500 also includes a transformer 510 that includes a primary winding $L_{PRI}$ and a secondary winding $L_{SEC}$. The input voltage $V_{IN}$ is provided at a center tap of the primary winding $L_{PRI}$, and the primary winding $L_{PRI}$ is coupled to the first switching node 504 and the second switching node 506. Therefore, the NFETs $N_1$ and $N_2$ can be activated in a sequence by the switching signal SW to provide the primary voltage $V_{PRI}$ from the input voltage $V_{IN}$ on the primary winding $L_{PRI}$. Based on the push-pull arrangement of the switching system 502, the sequence of activation of the NFETs $N_1$ and $N_2$ can result in two states of the switching system 502. In a first state, the NFET $N_1$ is activated. In a second state, the NFET $N_2$ is activated.

Also, the switching system 502 includes an NFET $N_5$ and an NFET $N_6$ that are each controlled by a signal SHT. The NFET $N_5$ is coupled to the first switching node 504 and to the NFET $N_6$, and the NFET $N_6$ is coupled to the second switching node 506 and the NFET $N_5$. Therefore, the signal SHT is provided to concurrently activate the NFETs $N_5$ and $N_6$ to short the primary winding $L_{PRI}$. For example, the signal SHT can be provided from logic or a state machine that can periodically assert the signal SHT (e.g., at each cycle or a number of cycles of the switching signal SW), so the primary winding $L_{PRI}$ is short-circuited to provide zero amplitude of the primary voltage $V_{PRI}$. As described in greater detail herein, the shorting of the primary winding $L_{PRI}$ can facilitate load regulation of the power supply circuit 500.

As described above, the polarity of the primary voltage $V_{PRI}$ is alternately reversed in each switching cycle of the NFETs $N_1$ and $N_2$ in the switching system 502, as provided by the switching signal SW. The transformer 510 therefore induces a secondary voltage $V_{SEC}$ in the secondary winding $L_{SEC}$ responsive to the primary voltage $V_{PRI}$ being provided in the primary winding $L_{PRI}$. The secondary voltage $V_{SEC}$ is likewise reverses polarity in each of the switching cycles of the NFETs $N_1$ and $N_2$ in the switching system 502, as provided by the switching signal SW.

The power supply circuit 500 also includes an output stage 512 that can provide the output voltage $V_{OUT}$ across a load, shown as a load resistor $R_L$, based on the secondary voltage $V_{SEC}$. In the example of FIG. 5, the output stage 512 includes a first diode $D_1$, a second diode $D_2$, a third diode $D_3$, and a fourth diode $D_4$, and is therefore arranged substantially the same as the output stage 316 in the example of FIG. 3.

The power supply circuit 500 further includes a resonant capacitor $C_{RES}$ that is coupled to the secondary winding $L_{SEC}$ of the transformer 510. The arrangement of the resonant capacitor $C_{RES}$ and the secondary winding $L_{SEC}$ are therefore the same as described above in the example of FIG. 3. Accordingly, the switching signal SW can be set at a frequency (e.g., $f_{SW}$ in the example of FIG. 2) that is less than the resonant frequency (e.g., $f_{RES}$ in the example of FIG. 2) of the secondary resonator to provide a constant amplitude of the output voltage $V_{OUT}$. As a result, errors in the amplitude of the output voltage $V_{OUT}$ can be mitigated in the power supply circuit 500.

Figure 6:
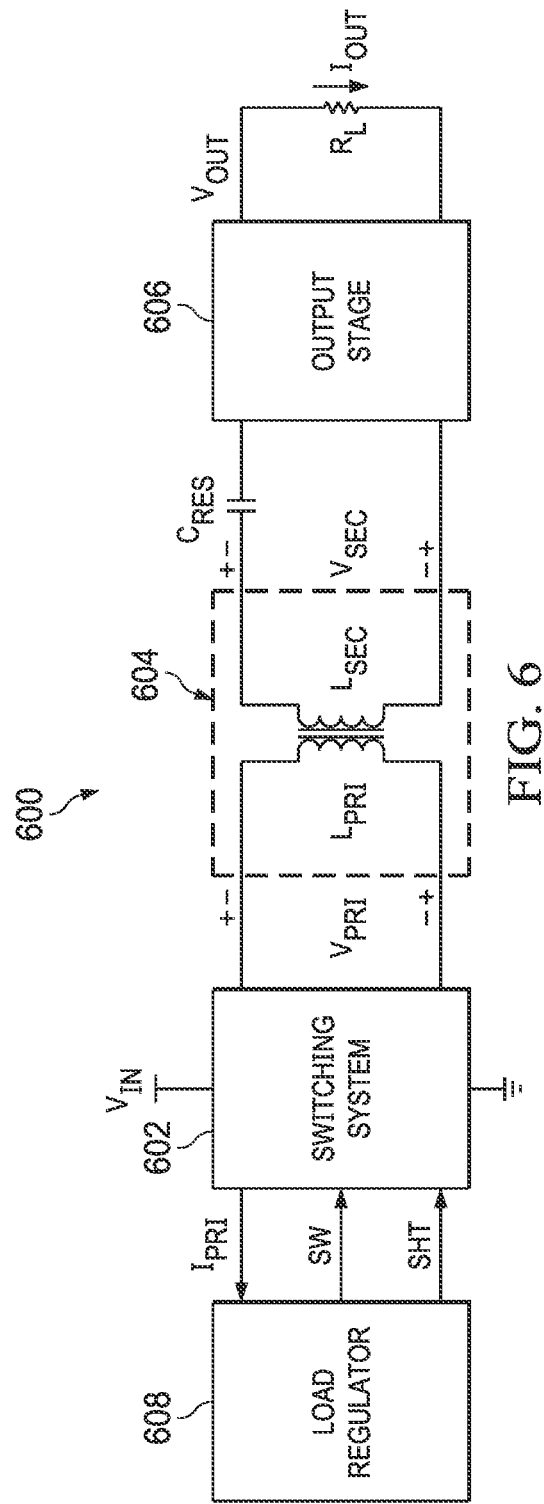
FIG. 6 is another schematic of a power supply system.

FIG. 6 illustrates another example of a switching power supply system 600. The power supply system 600 can be implemented in any of a variety of circuit applications for efficiently providing an output voltage $V_{OUT}$ based on an input voltage $V_{IN}$. The power supply system 600 includes a switching system 602 that includes at least one switch periodically activated responsive to a switching signal SW. For example, the switching system 602 can correspond to any of the switching systems 302, 402, and 502 described above in the respective examples of FIGS. 3-5.

The power supply system 600 also includes a transformer 604 that includes a primary winding $L_{PRI}$ and a secondary winding $L_{SEC}$, and an output stage 606 that can provide the output voltage $V_{OUT}$. The power supply system 600 further includes a resonant capacitor $C_{RES}$ that is coupled to the secondary winding $L_{SEC}$ of the transformer 604. Therefore, the power supply system 600 is configured to provide the output voltage $V_{OUT}$ in the manner described above regarding the examples of FIGS. 1-5. Particularly, the switching system 602 can operate the switches at a switching frequency that is less than the resonant frequency of the secondary resonator and maintain a unity gain of the power supply system 600.

In the example of FIG. 6, the power supply system 600 also includes a load regulator 608. The load regulator 608 is shown as receiving a primary current $I_{PRI}$ corresponding to a current through the primary winding $L_{PRI}$ from the switching system 602, and as providing the switching signal SW and the signal SHT to the switching system 602. For example, the load regulator 608 can sample an amplitude of the primary current $I_{PRI}$, such as when the primary winding $I_{PRI}$ is shorted (e.g., during the third or fourth phase of the full-bridge switching system 302 in the example of FIG. 3 or responsive to activation of the signal SHT in the switching systems 402 and 502 in the respective examples of FIGS. 4 and 5). The load regulator 608 can be configured to modify the frequency of the switching signal SW based on the load (e.g., the resistance of the load $R_L$ in the examples of FIGS. 3-5).

For example, the primary current $I_{PRI}$ is provided in each direction through the primary winding $L_{PRI}$ as a half-sine current pulse, and thus the secondary voltage $V_{SEC}$ is provided to the load resistance $R_L$ as a half-sine current pulse. The average of the half-sine pulses is equal to a DC current provided to the load resistance $R_L$, shown in the example of FIG. 6 as an output current $I_{OUT}$. If the frequency of the switching signal SW is held constant, the amplitude of the primary current $I_{PRI}$, and by extension the secondary voltage $V_{SEC}$, increases responsive to an increase in the load resistance $R_L$. Accordingly, a voltage drop on the total equivalent resistance in series with the load resistance $R_L$ can increase, resulting in a decrease of the output voltage $V_{OUT}$.

As a result, the load regulator 608 can be configured to sample the primary current $I_{PRI}$ to maintain the primary current $I_{PRI}$ at a peak value to accommodate a full value of the load resistance $R_L$ and to adjust the frequency of the switching signal SW responsive to a decrease in the load resistance $R_L$. The sampling of the primary current $I_{PRI}$ can occur when the primary current is approximately at its peak value. As described above, the delay time of the delay element 310 in the example of FIG. 3 can be set to approximately half the period of the resonant frequency of the secondary resonator. Therefore, the primary winding $L_{PRI}$ is shorted at alternating intervals between the alternating polarities of the primary current $I_{PRI}$, and the primary current $I_{PRI}$ is sampled at the peak amplitude of the primary current $I_{PRI}$. Similarly, the load regulator 608 can assert the signal SHT at an appropriate interval to sample the peak amplitude of the primary current $I_{PRI}$. For example, the load regulator can compare the peak amplitude of the primary current $I_{PRI}$ with a reference value to maintain the half-sine current pulses at a peak amplitude of a full load resistance $R_L$ to provide for a substantially equal voltage drop across the total equivalent resistance in series with the load resistance $R_L$ for all values of the load resistance $R_L$. Accordingly, the load regulator 608 can adjust the frequency of the switching signal SW to accommodate changes to the value of the load resistance $R_L$.

Figure 7:
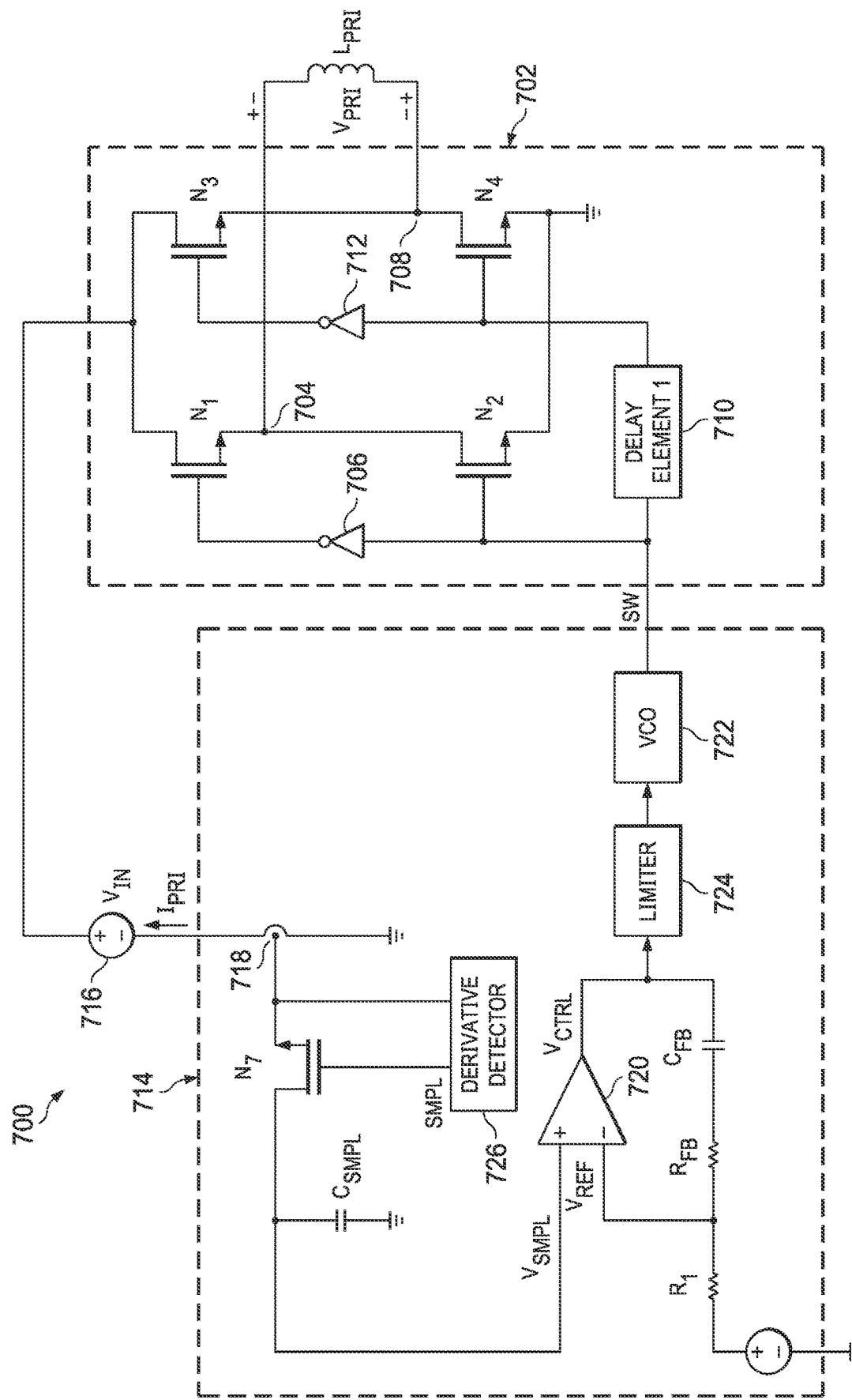
FIG. 7 is another schematic of a power supply circuit.

FIG. 7 illustrates another example of a power supply circuit 700. The power supply circuit 700 can be implemented in any of a variety of circuit applications for efficiently providing an output voltage $V_{OUT}$ based on an input voltage $V_{IN}$. The power supply circuit 700 can correspond to the power supply system 600 in the example of FIG. 6. Therefore, reference is to be made to the examples of FIG. 6 in the following description of the example of FIG. 7.

The power supply circuit 700 includes a switching system 702 that includes a set of MOSFET switches that are periodically activated responsive to a switching signal SW. In the example of FIG. 7, the switching system 702 includes a NFET $N_1$, a second NFET $N_2$, a third NFET $N_3$, and a fourth NFET $N_4$. The switching system also includes a switching node 704, an inverter 706, a switching node 708, a first delay element 710, and an inverter 712. Therefore, the switching system 702 is arranged as a full-bridge, as described above in the example of FIG. 3. The power supply circuit 700 also includes a primary winding $I_{PRI}$ that is part of a transformer (omitted in the example of FIG. 7 for brevity). For example, the primary winding $L_{PRI}$ can be coupled to the secondary winding $L_{SEC}$ that provides the secondary voltage $V_{SEC}$ to the resonant capacitor $C_{RES}$ and an output stage that provides the output voltage $V_{OUT}$ to the load resistance $R_L$, similar to as described above in the examples of FIGS. 3-6.

In the example of FIG. 7, the power supply circuit 700 also includes a load regulator 714. The load regulator 714 is coupled to the loop that provides the input voltage $V_{IN}$, shown at 716, to sample the primary current $I_{PRI}$ from the switching system 702. In the example of FIG. 7, the input voltage $V_{IN}$ is generated by a voltage source 718. The load regulator 714 includes an NFET $N_7$ that is coupled to the connection 716 and to a sampling capacitor $C_{SMPL}$. The NFET $N_7$ is controlled at a gate by a signal SMPL, so the NFET $N_7$ is activated by the signal SMPL to sample the peak amplitude of the primary current $I_{PRI}$ as a sampling voltage $V_{SMPL}$ on the sampling capacitor $C_{SMPL}$. Therefore, the sampling voltage $V_{SMPL}$ can have an amplitude that is proportional to the peak amplitude of the primary current $I_{PRI}$ through the primary winding $L_{PRI}$. Accordingly, the amplitude of the sampling voltage $V_{SMPL}$ can likewise be proportional to the amplitude of the DC current $I_{OUT}$ through the load resistance $R_L$, as described above in the example of FIG. 6.

The sampling capacitor $C_{SMPL}$ is coupled to an error amplifier 720 that is configured to compare the sampling voltage $V_{SMPL}$ to a reference voltage $V_{REF}$. The reference voltage $V_{REF}$ is shown in the example of FIG. 7 as being generated by a voltage source 722 and provided through a resistor $R_1$. For example, the reference voltage $V_{REF}$ can be tuned to be representative of a peak amplitude of the primary current $I_{PRI}$ for a full load of the load resistance $R_L$. The error amplifier 720 is shown as having a feedback connection of a capacitor $C_{FB}$ and a resistor $R_{FB}$, so the error amplifier 720 can provide a control voltage $V_{CTRL}$ based on a difference between the sampling voltage $V_{SMPL}$ and the reference voltage $V_{REF}$. The control voltage $V_{CTRL}$ is provided to a voltage-controlled oscillator (VCO) 722 through a limiter circuit 724. The VCO 722 is configured to generate the switching signal SW at a frequency that is based on the amplitude of the control voltage $V_{CTRL}$, and the limiter circuit 724 provides high and low limits of the control voltage $V_{CTRL}$ to provide respective maximum and minimum values of the frequency of the switching signal SW. Therefore, the switching signal SW is provided to the switching system 702 to control the NFETs $N_1$ through $N_4$, as described above.

In the example of FIG. 7, the load regulator 714 further includes a derivative detector 726. The derivative detector 726 receives the primary current $I_{PRI}$ at an input and is configured to generate the signal SMPL at an output. For example, the derivative detector 726 can include analog or digital capability to determine a derivative of the amplitude of the primary current $I_{PRI}$. Therefore, the derivative detector 726 can monitor the derivative of the amplitude of the primary current $I_{PRI}$. Accordingly, responsive to determining a zero-crossing of the derivative of the amplitude of the primary current $I_{PRI}$, the derivative detector 726 can determine that the primary current $I_{PRI}$ has achieved a peak amplitude. In response, the derivative detector 726 can assert the signal SMPL to activate the activate the NFET $N_7$ to sample the peak amplitude of the primary current $I_{PRI}$ at each polarity of the flow of the bidirectional primary current $I_{PRI}$ through the primary winding $L_{PRI}$.

In this manner, the load regulator 730 can be configured to sample the primary current $I_{PRI}$ to maintain the primary current $I_{PRI}$ at a peak value to accommodate a full value of the load resistance $R_L$, and to adjust the frequency of the switching signal SW based on the VCO 722 responsive to a decrease in the load resistance $R_L$. For example, the load regulator 722 can regulate the voltage $V_{SMPL}$, corresponding to the sampled peak amplitude of the primary current $I_{PRI}$, to approximately the amplitude of the reference voltage $V_{REF}$, corresponding to a full load resistance $R_L$, to maintain the peak amplitude of the primary current $I_{PRI}$ despite a dynamic load resistance $R_L$. Therefore, the voltage loss on series elements at the output of the power supply circuit 700 can be maintained at a value that is independent of the load $R_L$, thereby providing load regulation of the power supply circuit 700.

The arrangement of the load regulator 714 is provided by example, and it is to be understood that other arrangements of the load regulator 714 can be implemented to provide regulation of the frequency of the switching signal SW based on the load resistance $R_L$. In the example of FIG. 7, the load regulator 714 is provided for example to operate with the switching system 702 arranged as a full-bridge circuit. Other examples of a load regulator 714 to operate with half-bridge and/or push-pull switching circuits, such as the switching circuits 402 and 502 described above in the respective examples of FIGS. 4 and 5, can be implemented instead. For example, such a load regulator can include logic and/or a state machine configured to activate the signal SHT to provide a short of the primary winding $L_{PRI}$ to facilitate sampling of the primary current $I_{PRI}$. Accordingly, the load regulator 714 can be arranged in a variety of ways.

Figure 8:
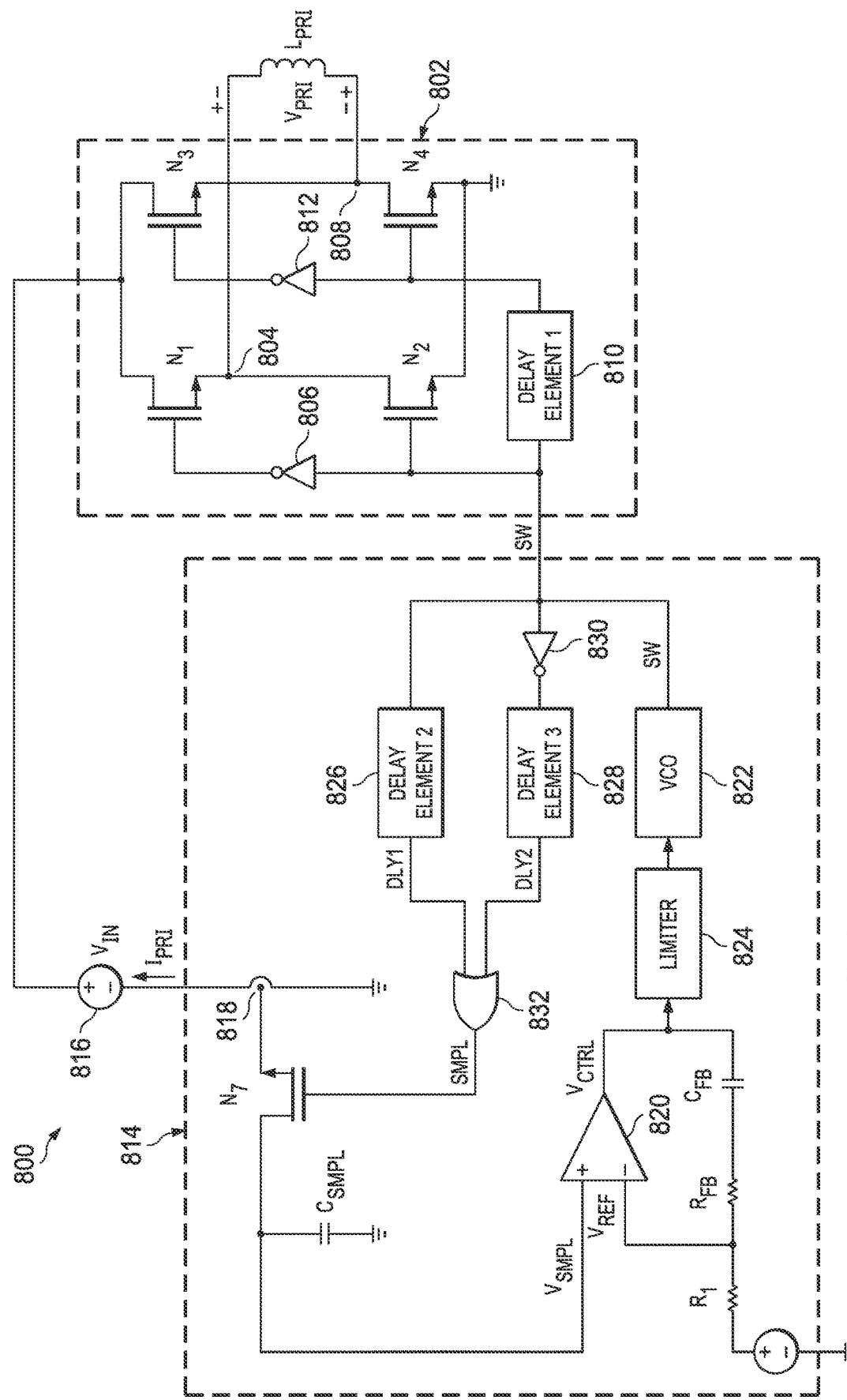
FIG. 8 is another schematic of a power supply circuit.

FIG. 8 illustrates another example of a power supply circuit 800. The power supply circuit 800 can be implemented in any of a variety of circuit applications for efficiently providing an output voltage $V_{OUT}$ based on an input voltage $V_{IN}$. The power supply circuit 800 can correspond to the power supply system 600 in the example of FIG. 6. Therefore, reference is to be made to the examples of FIG. 6 in the following description of the example of FIG. 8.

The power supply circuit 800 includes a switching system 802 that includes a set of MOSFET switches that are periodically activated responsive to a switching signal SW. In the example of FIG. 8, the switching system 802 includes a NFET $N_1$, a second NFET $N_2$, a third NFET $N_3$, and a fourth NFET $N_4$. The switching system also includes a switching node 804, an inverter 806, a switching node 808, a first delay element 810, and an inverter 812. Therefore, the switching system 802 is arranged as a full-bridge, as described above in the example of FIG. 3. The power supply circuit 800 also includes a primary winding $I_{PRI}$ that is part of a transformer (omitted in the example of FIG. 8 for brevity). For example, the primary winding $L_{PRI}$ can be coupled to the secondary winding $L_{SEC}$ that provides the secondary voltage $V_{SEC}$ to the resonant capacitor $C_{RES}$ and an output stage that provides the output voltage $V_{OUT}$ to the load resistance $R_L$, similar to as described above in the examples of FIGS. 3-6.

In the example of FIG. 8, the power supply circuit 800 also includes a load regulator 814. The load regulator 814 is coupled to the loop that provides the input voltage $V_{IN}$, shown at 816, to sample the primary current $I_{PRI}$ from the switching system 802. In the example of FIG. 8, the input voltage $V_{IN}$ is generated by a voltage source 818. The load regulator 814 includes an NFET $N_7$ that is coupled to the connection 816 and to a sampling capacitor $C_{SMPL}$. The NFET $N_7$ is controlled at a gate by a signal SMPL, so the NFET $N_7$ is activated by the signal SMPL to sample the peak amplitude of the primary current $I_{PRI}$ as a sampling voltage $V_{SMPL}$ on the sampling capacitor $C_{SMPL}$. Therefore, the sampling voltage $V_{SMPL}$ can have an amplitude that is proportional to the peak amplitude of the primary current $I_{PRI}$ through the primary winding $L_{PRI}$. Accordingly, the amplitude of the sampling voltage $V_{SMPL}$ can likewise be proportional to the amplitude of the DC current $I_{OUT}$ through the load resistance $R_L$, as described above in the example of FIG. 6.

The sampling capacitor $C_{SMPL}$ is coupled to an error amplifier 820 that is configured to compare the sampling voltage $V_{SMPL}$ to a reference voltage $V_{REF}$. The reference voltage $V_{REF}$ is shown in the example of FIG. 8 as being generated by a voltage source 822 and provided through a resistor $R_1$. For example, the reference voltage $V_{REF}$ can be tuned to be representative of a peak amplitude of the primary current $I_{PRI}$ for a full load of the load resistance $R_L$. The error amplifier 820 is shown as having a feedback connection of a capacitor $C_{FB}$ and a resistor $R_{FB}$, so the error amplifier 820 can provide a control voltage $V_{CTRL}$ based on a difference between the sampling voltage $V_{SMPL}$ and the reference voltage $V_{REF}$. The control voltage $V_{CTRL}$ is provided to a voltage-controlled oscillator (VCO) 822 through a limiter circuit 824. The VCO 822 is configured to generate the switching signal SW at a frequency that is based on the amplitude of the control voltage $V_{CTRL}$, and the limiter circuit 824 provides high and low limits of the control voltage $V_{CTRL}$ to provide respective maximum and minimum values of the frequency of the switching signal SW. Therefore, the switching signal SW is provided to the switching system 802 to control the NFETs $N_1$ through $N_4$, as described above.

The switching signal SW is also provided to a second delay element 826 and a third delay element 828 through an inverter 830. For example, the second and third delay elements 826 and 828 can be set to a delay that is approximately equal to one quarter of a period of the resonant frequency of the secondary resonator. The second delay element 826 provides a signal DLY1 that is a delayed version of the switching signal SW, and the third delay element 828 provides a signal DLY2 that is an inverted and delayed version of the switching signal SW. The signals DLY1 and DLY2 are provided to a logic-OR gate 832. The logic-OR gate 832 is configured to generate the signal SMPL based on the signals DLY1 and DLY2. Based on the delay provided by the delay elements 826 and 828 relative to the delay provided by the first delay element 810, the logic-OR gate 832 can activate the NFET $N_7$ to sample the peak amplitude of the primary current $I_{PRI}$ at each polarity of the flow of the bidirectional primary current $I_{PRI}$ through the primary winding $L_{PRI}$.

In this manner, the load regulator 830 can be configured to sample the primary current $I_{PRI}$ to maintain the primary current $I_{PRI}$ at a peak value to accommodate a full value of the load resistance $R_L$, and to adjust the frequency of the switching signal SW based on the VCO 822 responsive to a decrease in the load resistance $R_L$. For example, the load regulator 822 can regulate the voltage $V_{SMPL}$, corresponding to the sampled peak amplitude of the primary current $I_{PRI}$, to approximately the amplitude of the reference voltage $V_{REF}$, corresponding to a full load resistance $R_L$, to maintain the peak amplitude of the primary current $I_{PRI}$ despite a dynamic load resistance $R_L$. Therefore, the voltage loss on series elements at the output of the power supply circuit 800 can be maintained at a value that is independent of the load $R_L$, thereby providing load regulation of the power supply circuit 800.

The arrangement of the load regulator 814 is provided by example, and it is to be understood that other arrangements of the load regulator 814 can be implemented to provide regulation of the frequency of the switching signal SW based on the load resistance $R_L$. In the example of FIG. 8, the load regulator 814 is provided for example to operate with the switching system 802 arranged as a full-bridge circuit. Other examples of a load regulator 814 to operate with half-bridge and/or push-pull switching circuits, such as the switching circuits 402 and 502 described above in the respective examples of FIGS. 4 and 5, can be implemented instead. For example, such a load regulator can include logic and/or a state machine configured to activate the signal SHT to provide a short of the primary winding $L_{PRI}$ to facilitate sampling of the primary current $I_{PRI}$. Accordingly, the load regulator 814 can be arranged in a variety of ways.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

In this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is described herein as including certain components may instead be configured to couple to those components to form the described circuitry or device. For example, a structure described herein as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure, either at a time of manufacture or after a time of manufacture, such as by an end-user and/or a third-party.

Modifications are possible in the described embodiments, and other embodiments are possible, within the scope of the claims.

What is claimed is:

1. A circuit comprising:
a transformer having first and second transformer inputs and first and second transformer outputs, the first transformer output adapted to be coupled through a capacitor to a first input of an output stage, and the second transformer output adapted to be coupled to a second input of the output stage;
a switching system having first and second inputs and first and second switching outputs, the first input configured to receive a switching signal, the second input configured to receive an input voltage, and the first and second switching outputs respectively coupled to the first and second transformer inputs, the switching system including switches that are controlled by the switching signal; and
a load regulator having a first input configured to sample a current through a primary winding of the transformer, and an output that provides the switching signal to the first input of the switching system responsive to a peak amplitude of the current, the load regulator including:
a derivative detector having an input and an output, the input configured to receive a signal indicating the amplitude of the current through the primary winding; and
a sampling switch coupled to the output of the derivative detector, the sampling switch configured to close responsive to detecting a zero-crossing of a derivative of the current to enable sampling the peak amplitude of the current.

2. The circuit of claim 1, wherein the switching signal has a frequency that is less than a resonant frequency of the capacitor and a secondary winding of the transformer.

3. The circuit of claim 1, wherein the switching system is arranged as one of a full-bridge switching system, a half-bridge switching system, and a push-pull switching system.

4. The circuit of claim 1, wherein the switching system includes at least one switch that is configured to short circuit the first primary input and the second primary input, and wherein the load regulator includes a second output that provides a short signal to the at least one switch.

5. The circuit of claim 1, wherein the load regulator includes:
a voltage-controlled oscillator (VCO) having an input and an output, the output corresponding to the output of the load regulator; and
a frequency adjustment component having an input configured to receive a control signal proportional to an amplitude of the current, and an output coupled to the input of the VCO.

6. The circuit of claim 5, wherein the load regulator further includes an amplifier having a first input configured to receive a reference voltage, and a second input configured to receive a voltage that is proportional to the peak amplitude of the current, the amplifier having an output that provides the control signal.

7. A switching power supply system comprising:
a switching system having a switching input and a switching output, the switching system including switches configured to close responsive to a switching signal at the switching input, and the switching system configured to provide a first voltage at the switching output responsive to closing the switches;
a transformer including a primary winding and a secondary winding, the primary winding coupled to the switching output and configured to receive the first voltage, and the secondary winding configured to provide a second voltage responsive to the first voltage;
a capacitor coupled to the secondary winding;
an output stage coupled to the capacitor, the output stage configured to generate an output voltage by rectifying the second voltage; and
a load regulator configured to sample an amplitude of a current through the primary winding to adjust a frequency of the switching signal based on a peak amplitude of the current, the load regulator including:

a derivative detector having an input configured to receive a signal indicating the amplitude of the current through the primary winding, and an output; and a sampling switch coupled to the output of the derivative detector, the sampling switch configured to close responsive to detecting a zero-crossing of a derivative of the primary current enabling the load regulator to sample the peak amplitude of the current.

8. The system of claim 7, wherein the switching signal has a frequency that is less than a resonant frequency of the capacitor and the secondary winding of the transformer.

9. The system of claim 7, wherein the load regulator includes:

a frequency adjustment component configured to generate a control voltage proportional to an amplitude of the current; and a voltage-controlled oscillator (VCO) configured to generate the switching signal at a frequency that is proportional to the control voltage.

10. The system of claim 9, wherein the load regulator further includes:

a sampling capacitor configured to sample a sampling voltage that is proportional to the peak amplitude of the current; and an amplifier configured to compare the sampling voltage with a reference voltage and to generate a control signal responsive to the comparison.

11. A switching power supply system comprising:

a switching system having:

first and second inputs and first and second switching outputs, the first input configured to receive a switching signal, the switching signal having a switching frequency, and the second input configured to receive an input voltage switches that are controlled by the switching signal; and a load regulator that includes:

a first input configured for sampling a current through a primary winding of the transformer, and an output that provides the switching signal to the first input of the switching system responsive to a peak amplitude of the current;

a derivative detector having an input, the derivative detector configured to receive a signal indicating the amplitude of the current through the primary winding, and an output; and a sampling switch coupled to the output of the derivative detector, the sampling switch configured to close responsive to detecting a zero-crossing of a derivative of the current allowing the load regulator to sample the peak amplitude of the current;

a transformer having a primary winding and a secondary winding, the primary winding having first and second transformer inputs, and the secondary winding having first and second transformer outputs, in which the first transformer input is coupled to the first switching output, and the second transformer input is coupled to the second switching output;

an output stage having a first and second voltage inputs and a voltage output, the second voltage input coupled to the second transformer output, and the output stage configured to provide an output voltage at the voltage output responsive to the first and second voltage inputs; and a capacitor coupled between the first transformer output and the first voltage input, in which the capacitor and the secondary winding have a resonant frequency above the switching frequency.

12. The system of claim 11, wherein the switching system includes at least one switch that is configured to short circuit the first primary input and the second primary input, wherein the load regulator includes a second output that provides a short signal to the at least one switch.

13. The system of claim 11, wherein the load regulator further includes:

a voltage-controlled oscillator (VCO) having an input and an output, the output corresponding to the output of the load regulator; and a frequency adjustment component having an input that receives a control signal associated with an amplitude of the current and an output coupled to the input of the VCO.

14. The system of claim 13, wherein the load regulator further includes an amplifier having a first input configured to receive a reference voltage, and a second input configured to receive a voltage that is proportional to the peak amplitude of the current, the amplifier having an output that provides the control signal.

* * * * *